United States Patent
Stickles et al.

(10) Patent No.: US 11,642,944 B2
(45) Date of Patent: May 9, 2023

(54) REAR DEFROST FOR A SOFT TOP

(71) Applicant: Bestop, Inc., Louisville, CO (US)

(72) Inventors: George C. Stickles, Thornton, CO (US); Eric D. Getzschman, New Baltimore, MI (US)

(73) Assignee: BESTOP, INC, Louisville, CO (US)

(*) Notice: Subject to any disclaimer, the term of this patent is extended or adjusted under 35 U.S.C. 154(b) by 432 days.

(21) Appl. No.: 16/353,682

(22) Filed: Mar. 14, 2019

(65) Prior Publication Data

US 2019/0283552 A1 Sep. 19, 2019

Related U.S. Application Data

(60) Provisional application No. 62/643,195, filed on Mar. 15, 2018.

(51) Int. Cl.
*B60J 1/18* (2006.01)
*H05B 3/86* (2006.01)
*B60J 1/00* (2006.01)

(52) U.S. Cl.
CPC .............. *B60J 1/1815* (2013.01); *B60J 1/002* (2013.01); *H05B 3/86* (2013.01)

(58) Field of Classification Search
CPC . B60J 1/1815; B60J 1/002; B60J 1/007; B60J 1/0085; B60J 7/123; B60J 7/1858; B60J 7/1266; B60J 7/10; B60J 5/101; B60J 5/105; H05B 3/86
See application file for complete search history.

(56) References Cited

U.S. PATENT DOCUMENTS

| | | | | |
|---|---|---|---|---|
| 3,388,945 A | * | 6/1968 | Kevelin | B60J 10/70 428/419 |
| 4,883,940 A | * | 11/1989 | Tokarz | H05B 3/86 219/203 |
| 5,111,329 A | * | 5/1992 | Gajewski | G02F 1/133305 359/260 |
| 5,829,195 A | * | 11/1998 | Ojanen | B60J 1/085 160/180 |
| 6,033,007 A | * | 3/2000 | Hirschvogel | B60J 7/1226 296/107.11 |
| 6,164,984 A | | 12/2000 | Schreiner | |
| 6,712,420 B1 | * | 3/2004 | Kargilis | B60J 1/1815 219/203 |
| 8,905,778 B2 | | 12/2014 | Jenrich et al. | |
| 8,932,074 B2 | | 1/2015 | Jenrich et al. | |
| 8,973,970 B2 | * | 3/2015 | Haberkamp | B60J 1/007 296/107.09 |
| 9,266,307 B2 | | 2/2016 | D'Haene | |

(Continued)

FOREIGN PATENT DOCUMENTS

| | | | | |
|---|---|---|---|---|
| DE | 10056895 B4 | * | 11/2008 | ............ B60J 1/1815 |
| DE | 102010012826 A1 | * | 9/2011 | ......... B29C 44/1238 |

*Primary Examiner* — Shawntina T Fuqua
(74) *Attorney, Agent, or Firm* — Warn Partners, P.C.

(57) ABSTRACT

A rear window construction for a Jeep type vehicle having a foldable soft top with a window connected with the top is provided. The window is not connected to any frame member of the vehicle. The rear window construction includes a flexible foldable top having means of releasable connection with the frame structure of the vehicle. Additionally a rear window structure is provided. The rear window structure has a heating element for defrosting the rear window structure.

13 Claims, 3 Drawing Sheets

(56) References Cited

U.S. PATENT DOCUMENTS

| | | |
|---|---|---|
| 2006/0011596 A1 | 1/2006 | Sharp et al. |
| 2007/0020465 A1 | 1/2007 | Thiel et al. |
| 2008/0028697 A1 | 2/2008 | Li et al. |
| 2011/0233959 A1* | 9/2011 | Cover .................. B60J 7/10 296/107.09 |
| 2015/0351161 A1* | 12/2015 | Kramer .................. B60J 1/18 219/203 |
| 2015/0367782 A1 | 12/2015 | Mannheim Astete et al. |

* cited by examiner

REAR DEFROST FOR A SOFT TOP

FIELD OF THE INVENTION

The present invention relates to rear window construction for a Jeep type vehicle having a soft top.

BACKGROUND OF THE INVENTION

Most Jeep type vehicles have one or two rows of seating with a cargo box positioned rearward of the seating. Many Jeep type vehicles have roll bars. A foldable flexible top may be provided that is releasably connected with the roll bars toward a rear end of the vehicle. To provide added exposure to the environment it is often desirable to fold down the top.

During winter months, the rear window can easily fog up due to the presence of cold air. It is desirable to provide the rear window with an electrically powered defroster. It is also desirable to provide a capability to block the transmission of light through the rear window when the vehicle is parked to prevent others from seeing the contents in a vehicle cargo box. It is also desirable to personalize the rear window with sport team logos.

SUMMARY OF THE INVENTION

To make manifest the above noted and other manifold desires, a revelation of the present invention is brought forth. In a preferred embodiment the present invention endows a freedom of a rear window construction for a Jeep type vehicle having a foldable soft top and a window connected with the top. The window is not connected to any frame member of the vehicle. The rear window construction includes a flexible foldable top having means of releasable connection with the frame structure of the vehicle. Additionally a rear window structure is provided. The rear window structure has a heating element for defrosting the same.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
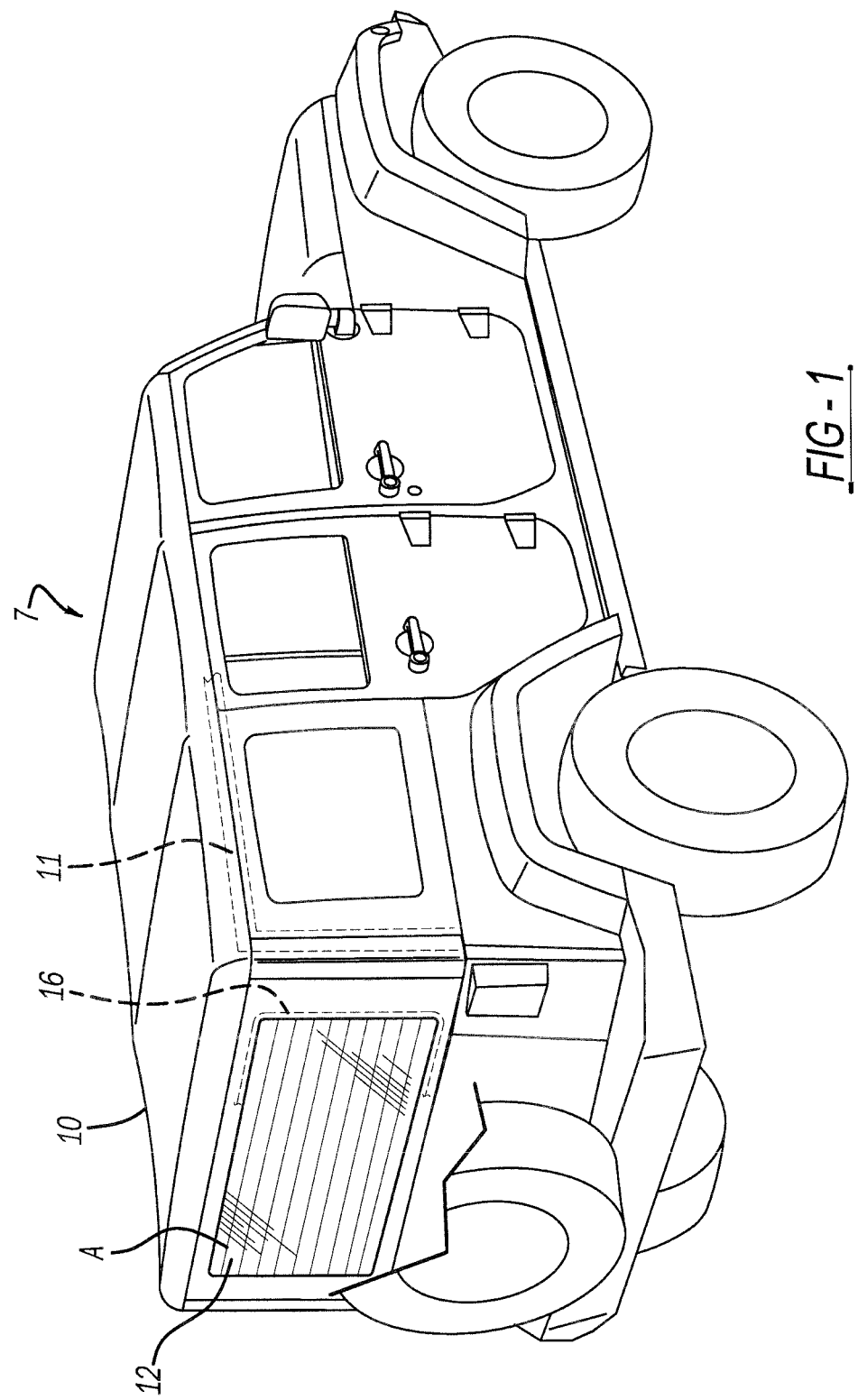
FIG. 1 is a perspective view of a Jeep type vehicle having a flexible foldable top with a rear window construction according to the present invention.
Figure 2:
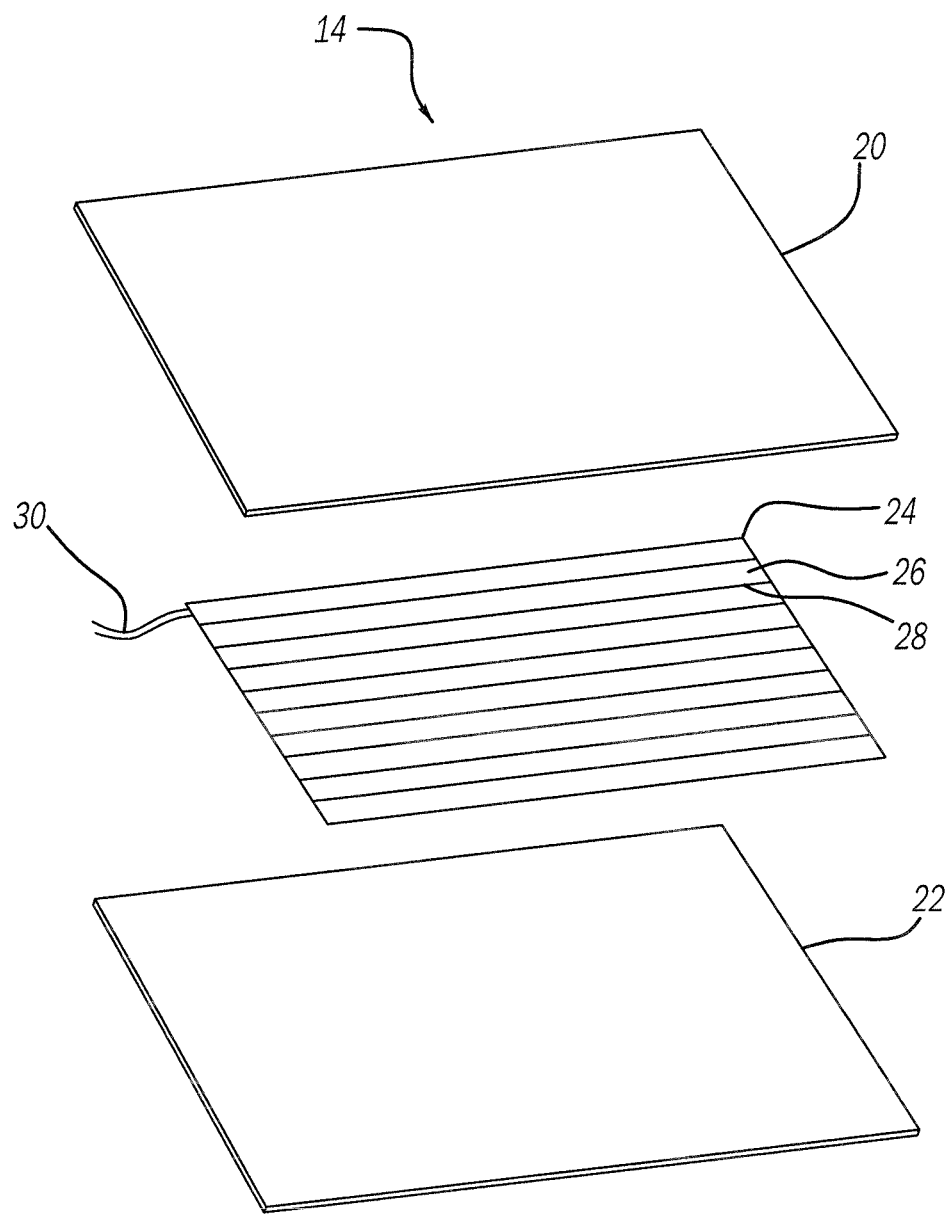
FIG. 2 is an exploded view of a rear window assembly utilized in the vehicle shown in 1.
Figure 3:
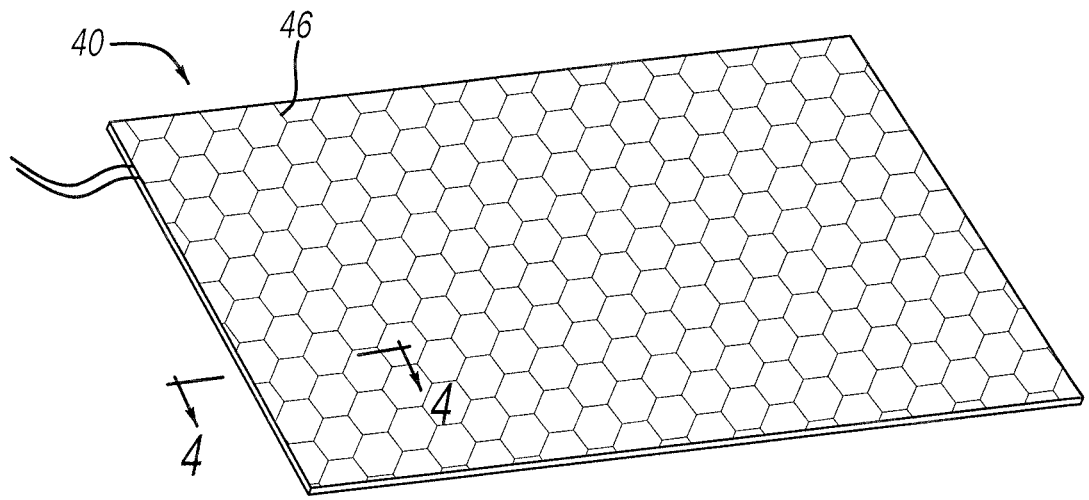
FIG. 3 is a perspective view of an alternated preferred embodiment window assembly.
Figure 4:
FIG. 4 is an enlarged sectional view taken along lines 4-4 of a top layer of the window assembly shown in FIG. 3.
Figure 5:
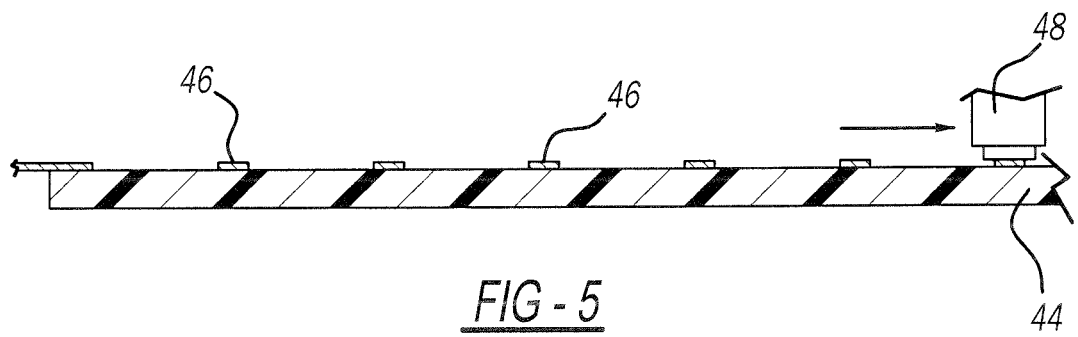
FIG. 5 is a sectional view taken along line 4-4 of the lower layer of the window assembly shown in FIG. 3 that illustrates a fabrication process.
Figure 6:
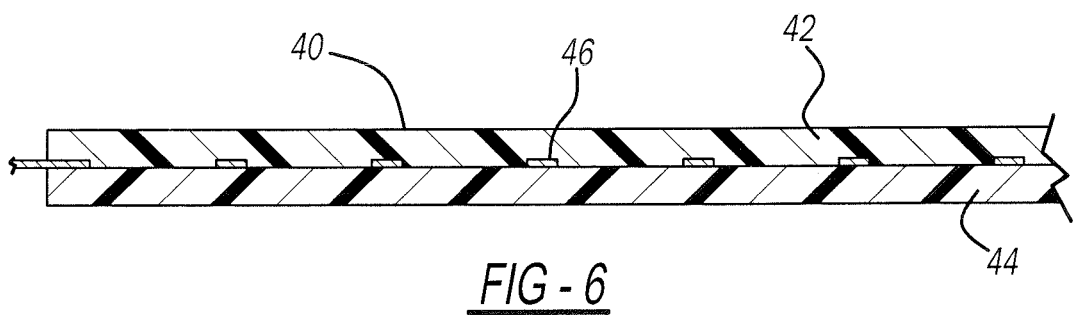
FIG. 6 is an enlarged sectional view of window assembly shown in FIG. 3 along lines 4-4.

Referring to FIGS. 1-6 a Jeep type Sport Utility Vehicle (SUV) automotive vehicle 7 is provided. Jeep type vehicles 7 typically have one or two rows of passenger seating areas with a cargo box rearward of the passenger seating. In the embodiment shown the cargo area is covered by a soft foldable top 10. The top 10 is releasably connected to the vehicle frame 11 (only partially shown in phantom) commonly referred to as a roll cage. The top 10, when released from the vehicle frame 11 can be folded down to allow added exposure to the environment for the vehicle occupants. The connection may be accomplished with snap type connectors and or connective strapes.

In a rear portion of the top 10 is a rear window structure 12. The rear window structure 12 has a generally vertically positioned window assembly 14 (which can be angled from 45 to 90 dgrees from horizontal). The window assembly 14 is not connected to the frame 11 but is only connected to the top 10. In the example shown the window assembly 14 along a perimeter of the window assembly is connected to the top 10 by a radio-frequency welding process along a weld line 16 (only partially shown in phantom). The window assembly 14 may be glass, however in most applications the window assembly will be fabricated by a multi-layered rigid or flexible polymeric material such as PVC or polycarbonate material. In the preferred embodiment shown in FIG. 2 the window assembly 14 has upper and lower clear Polyvinyl Chloride (PVC) layers 20 and 22 respectively. Juxtaposing the layers 20 and 22 is electronic heating element 24. Heating element 24 has a polymeric substrate 26 with a series of metallic wires 28. Heating element 24 is connected with the vehicles electrical system via a cable 30. Heating element 24 can also be provided by a conductive film.

Referring to FIG. 3-6 a window assembly 40 is provided. Window assembly 40 has polymeric layers 42 and 44. Window assembly 40 has an electronic heating element 46. The heating element 46 is applied through a layered application of a conductive ink or material such as silver, silver/graphite or any other conductive material that can be layered with screen printing. As shown, the heating element 46 is deposited in a hexagonal shape by a digital applicator 48. After the heating element 46 is deposited the polymeric layer 44 is mated with polymeric layer 42.

The heating element can also be printed on to form a logo or decal or other design element or even a shade element. In some applications a translucent printing or a changeable printed material could be used to control translucent properties of the window assembly. In the alternative an LCD or other printed element could be interposed in conjunction with the heating element, such that for instance when the vehicle is not in use, the window assembly is programed or normally off to provide and opaque layer to provide privacy. In other applications the heating element will be programed to maximize reflectivity to lower the temperature within the vehicle. In cold weather the heating element will maximize an admittance of light and energy into the vehicle and maximize any greenhouse effect of the window assembly. In still another application the heating element can be printed or programmed to illustrate decals on the window assembly. The decal can be for safety to provide warning to an approaching motorist or the decal may express a messages related to a favorite sport team, Universities or other organizations. In still another application the decal may be used to express social or political views.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A rear window construction for a sports utility vehicle having a foldable flexible soft top comprising:
   a soft foldable top releasably connected with a frame structure of the vehicle;
   a rear window structure with a printed element interposed in conjunction with a heating element for defrosting the rear window structure wherein the rear window structure is programmed so that the printed element selectively provides an opaque layer to furnish privacy for the rear window structure when said vehicle is not in use, wherein the rear window structure is connected to the soft flexible top along a weld line and the rear window structure is not connected to the frame of the vehicle and the heating element is connected with a vehicle electrical system by a cable, and
   wherein said rear window structure is flexible and includes an upper layer and lower layer of clear polyvinyl chloride with an electronic heating element formed of a conductive film juxtaposed between the upper layer and lower layer of clear polyvinyl chloride.

2. The rear window construction of claim 1, wherein said rear window structure is positioned generally vertically.

3. The rear window construction of claim 1, wherein said rear window heating element is fabricated from a film.

4. The rear window construction of claim 1, wherein said weld line is formed by a radio frequency welding technique.

5. The rear window construction of claim 1, wherein the electronic heating element formed of a polymeric substrate with a series of metallic wires.

6. The rear window construction of claim 5, wherein said heating element is fabricated from a conductive ink.

7. The rear window construction of claim 1, wherein said heating element can control the properties of said window structures for purposed of privacy, heat transfer or decal display.

8. The rear window construction of claim 7, wherein said heating element is digitally printed.

9. A rear window construction for a sports utility vehicle having a foldable flexible soft top comprising:
   a soft foldable top releasably connected with a frame structure of the vehicle;
   a rear window structure with a printed element wherein the rear window structure is programmed so that the printed element selectively provides an opaque layer to furnish privacy for the rear window structure when said vehicle is not in use, wherein the rear window structure is connected to the soft flexible top along a weld line and the rear window structure is not connected to the frame of the vehicle, and
   wherein said rear window structure is flexible and includes an upper layer and lower layer of clear polyvinyl chloride with the printed element juxtaposed between the upper layer and lower layer of clear polyvinyl chloride.

10. The rear window construction of claim 9, wherein the printed element of the rear window structure is programed to maximize reflectivity to control temperature within said vehicle.

11. The rear window construction of claim 9, wherein the printed element of the rear window structure is programed to maximize light admittance to control temperature within said vehicle.

12. The rear window construction of claim 9, wherein said weld line is formed by a radio frequency welding technique.

13. The rear window construction of claim 9, wherein said rear window structure is positioned generally vertically.

* * * * *